Patented Aug. 2, 1949

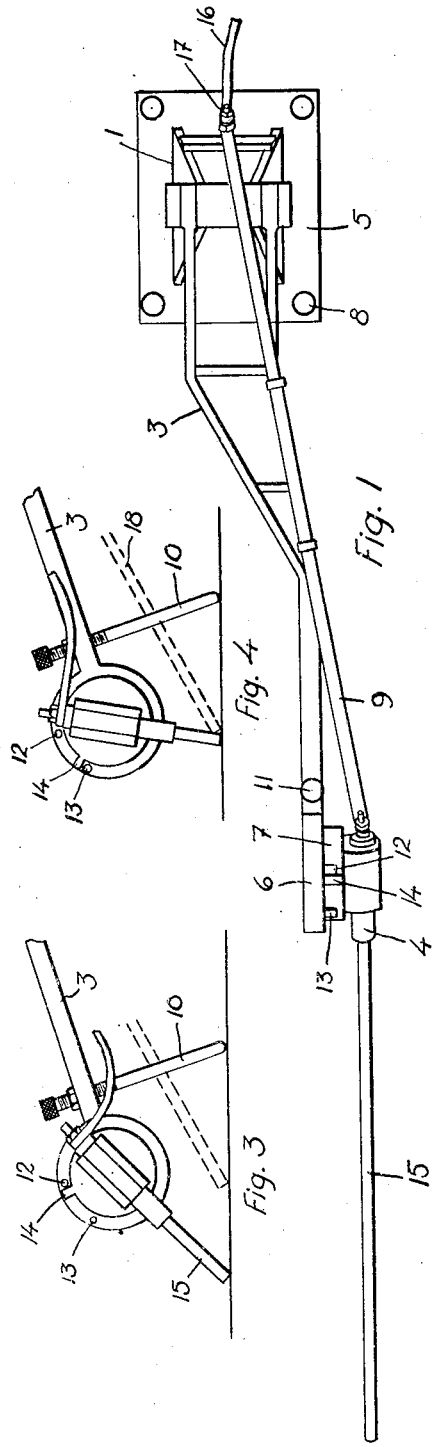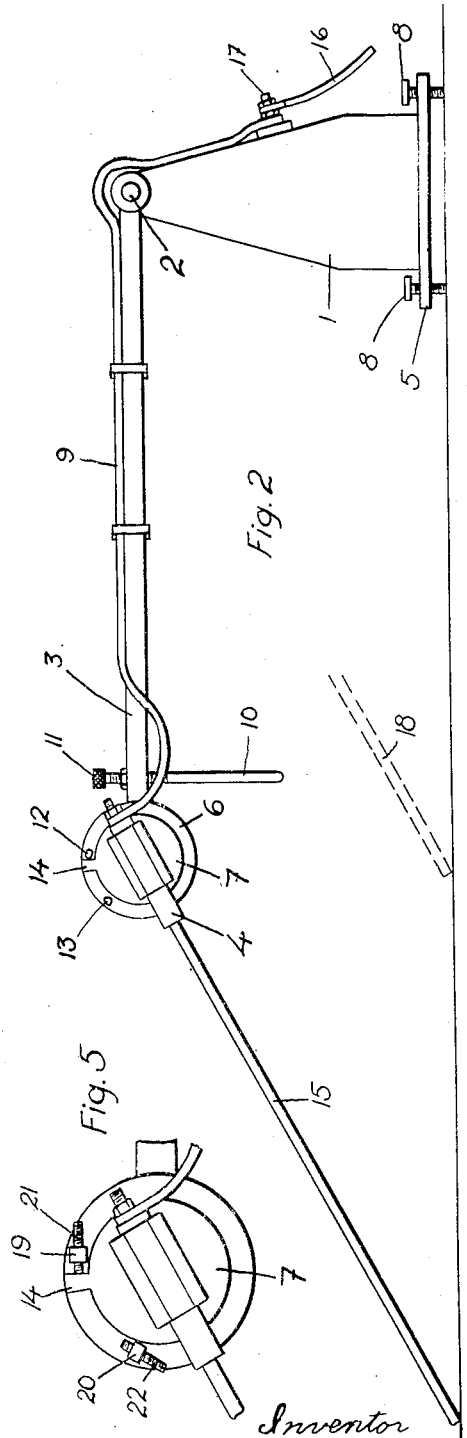

2,477,906

UNITED STATES PATENT OFFICE 2,477,906

APPARATUS FOR ELECTRIC ARC WELDING

Nils Gustav Smith, Goteborg, Sweden, assignor to Elektriska Svetsningsaktiebolaget, Goteborg, Sweden, a corporation of Sweden Application February 16, 1948, Serial No. 8,660
In Sweden December 19, 1946

Section 1, Public Law 690, August 8, 1946

5 Claims. (Cl. 219—8)

This invention relates to welding apparatus for so-called semi-automatic arc welding with rod-shaped coated electrodes. More particularly the invention relates to electric welding apparatus of the general type comprising a carrier member adapted to move in a predetermined course towards the work to be welded, and an electrode holding member, or socket member, attached to said carrier in such manner that an electrode mounted in said socket member will extend at an angle to the seam to be welded, said carrier member being operated by a mechanical force urging the same towards the work, whereby the electrode tip is maintained in engagement with the welding seam during the gradual melting of the electrode. The carrier member may be for instance a lever turning about a fulcrum, or a carriage guided in a linear path, and the force acting upon said carrier member may be its own weight. By the use of two (or more) such apparatus it is possible to provide for automatic changeover from a used-up electrode to a fresh one. To that end, one apparatus having the fresh electrode mounted therein is placed in front of the other apparatus in such position that the tip of the fresh electrode is situated at the point of the welding seam in which the rear electrode will be finished. The electrodes may be connected to a common source of current, or preferably to individual sources of current (transformers or generators). By this means the fresh electrode will be automatically started by the one about to be finished. If, however, the electrodes form too acute an angle with one another and with the workpiece, starting of the fresh electrode will sometimes fail to occur, owing to the fact that the arc of the used-up electrode does not get sufficiently close to the tip of the fresh electrode. It may also happen that, even if starting occurs according to plan, the welding will be irregular owing to insufficient supply of molten electrode metal to the portion of the joint intermediate the points at which the finished electrode stops and the fresh electrode starts.

The invention has for its principal purpose to improve the apparatus of the type above referred to in such manner as to remove or reduce its present disadvantages. According to the invention, the socket member, or electrode holding member, is attached to the carrier member through a joint adapted to allow of rotation of the electrode holding member in a plane through the welding seam, means being provided for opposing such rotation in the direction of the couple acting upon the electrode holder on engagement between the electrode tip and the work; furthermore, means are provided for checking the movement of the carrier member towards the work as soon as the electrode has burned down to a stub of predetermined length.

The invention shall now be explained with reference to the accompanying drawing, in which Fig. 1 is a plan view of one form of the apparatus according to the invention shown in its starting position.

Fig. 2 is a corresponding elevation.

Fig. 3 is a detail elevation of the electrode holder member and the adjacent portion of the carrier member shown in the position they will have when the electrode is nearly finished.

Fig. 4 is an elevational view similar to Fig. 3 showing the parts in the moment the electrode has arrived to the end of its travel.

Fig. 5 is a detail elevational view in larger scale of the electrode holder member and the joint in a somewhat modified form of the apparatus.

The apparatus shown in Figs. 1 to 4 comprises a support or standard 1, a carrier member 3 constituted by a lever hinged at one end to the top of the standard 1 through a bolt 2, a joint formed by disc 6 rigidly attached to the lever 3 and disc 7 rotatably connected to disc 6, and an electrode holder 4 attached to, but electrically insulated from the disc 7. The standard 1 is provided with a base plate 5 resting on the work with four screws 8. The lever 3 is provided with a rod-shaped stop member 10 the upper part of which forms a screw engaging a threaded bore in the lever 3 and having a knurled head 11 by means of which the vertical position of the stop member 10 may be adjusted. The disc 6 is provided with a pair of laterally projecting studs 12, 13 serving as stops cooperating with a radial projection 14 of the disc 7 so as to define a predetermined angular range within which the disc 7 with electrode holder 4 are movable. The electrode 15 is connected to supply cable 16 through connecting terminal 17 and pliable conductor link 9.

A second electrode 18 shown with dotted lines is placed with its tip resting against the work at the point of the welding seam which forms the termination of the path of the electrode 15, that is, the point at which said electrode is consumed down to a stub which cannot be utilized. Said second electrode 18 is assumed to be fitted in a second apparatus (not shown) of the same type as the one just described.

The welding will proceed as follows. The arc from the electrode 15 is struck in the usual way, for instance by inserting a conducting object between the bared core and the work, or by subjecting this point to the flame of a torch. During the first (and longest) part of the subsequent period during which a gradual fusing of the electrode occurs, the lever 3 and the holder 4 with electrode 15 will behave as a rigid system, as the couple created by the reaction from the work upon the electrode tip will maintain the projection 14 in stable engagement with stud 12. The position of said stud and the inclination of the electrode 15 resulting therefrom are so chosen that a predetermined amount of electrode metal is fused per unit of length of the welding seam. In the embodiment shown, the design is such that said ratio is constant during the entire period in which projection 14 remains in engagement with stud 12. When the welding has progressed so far that the electrode 15 is nearly exhausted, the bar 10 enters into engagement with the work, thus preventing further downwards movement of the lever 3. This phase is illustrated in Fig. 3. The melting of the electrode 15 will, however, progress a little further owing to the fact that the electrode holder 4 and the disc 7 are free to rotate on disc 6 under the action of the weight of the electrode holder 4 and the electrode stub 15. The electrode tip will therefore continue its travel along the welding seam and eventually reach the tip of the second electrode 18 (see Fig. 4). It will be noted that by the arrangement described the angle formed by the electrodes 15 and 18 when engaging one another is much greater than it would have been if the electrode 15 had not been free to rotate with regard to the lever 3. This feature will facilitate starting of the fresh electrode, and the fact that the tips of the electrode cores may be brought into close relation to one another will also result in an even, or substantially even supply of additional metal to the welding joint. The angle between the electrodes in the position illustrated in Fig. 4 will depend on the position chosen for the tip of the new electrode 18 in relation to the apparatus in which the first electrode (15) is held and may thus within limits be adjusted at will.

The progress of the change-over of the arc from one electrode to the other will to some degree depend on whether the welding apparatus are connected to one and the same source of welding current or to individual sources of current (e. g. welding transformers). At least in the second case the arc from the exhausted electrode will continue burning for a while after the new arc has been struck. The projection 13 shown will check the travel of the electrode 15, thus preventing an excessive supply of additional metal to the welding seam.

In the modified embodiment illustrated in Fig. 5, the studs 12, 13 have been replaced by projections 19, 20 supporting stop screws 21, 22, by which the range of angular movement of the disc 7 may be adjusted.

It should be expressly pointed out that the above description is intended to explain the principle of the invention only, and that the devices referred to may be modified and supplemented in many respects within the frame of the invention. Thus, the carrier member 3 does not have to be a lever, but may take the shape of a slide or like member with parallel motion. The bar 10 may be replaced by any other stop member suited to check further movement of the carrier member 3 as soon as the length of the electrode 14 has decreased to a predetermined value. The lever 3 or the standard 1 may for instance be provided with an adjustable stop screw cooperating with a portion of the standard or the lever, respectively.

The stud 13 or stop screw 22 may be dispensed with, as the device may operate satisfactorily without any particular means for limiting the final rotation of the electrode holder about its joint.

The studs 12, 13 or stop screws 21, 22 may of course be replaced by any other stop members suitable for limiting the rotation of the electrode holder. At least the stop member serving to maintain the holder in the correct position during the phase immediately following upon the starting of the electrode held therein should preferably be adjustable. As a rule, the range of angular movement between the stop members should be smaller than 45 degrees, e. g. 15 or 20 degrees.

Particularly in welding with thin electrodes having comparatively small weight it may be necessary or advisable to provide special means for rotating the electrode holder 4 with regard to the carrier member 3, for instance a weighted lever attached to said holder, or an extension spring acting between the lever 3 and the electrode holder 4. According to another possibility, the bar 10 connected to the lever 3 is replaced by a bar depending from a pivot pin provided on the right half of the disc 7. Said link then exercises the double function of limiting the downward movement of the lever 3 and producing an extra torque on the holder 4.

If the apparatus is to be used for vertical welding or downhand welding, the lever 3, or the member corresponding thereto, has to be provided with special means, e. g. a spring extended between the lever and the standard 1, or a weighted lever, for securing the required contact pressure between the electrode tip and the work.

The above description of various modifications or embodiments of the invention is in no way exhaustive, the purpose thereof being only to give some suggestions regarding the many ways in which the apparatus according to the invention may be adapted to the varying conditions and desiderata occuring in welding work.

1. Apparatus for electric arc welding seams with rod-shaped coated electrodes, comprising a carrier member, means for guiding said carrier member in a predetermined course directed generally towards the work to be welded, an electrode holding member, a joint connecting the electrode holding member to the carrier member in such manner as to allow of rotation of the electrode holding member in a plane through the seam to be welded, stop means for opposing such rotation in the direction of the couple acting upon the electrode holder on engagement between the electrode tip and the work, and stop means for restricting the movement of the carrier member towards the work, said last-mentioned stop means being so positioned as to come into action when a short length only of the electrode remains.

2. Apparatus according to claim 1 in which the means for restricting the movement of the carrier member is adjustable.

3. Apparatus according to claim 1 in which the means for restricting the movement of the carrier member is adapted to engage a portion of the work adjacent to the welding seam.

4. Apparatus according to claim 1 and in which a stop means is provided for limiting rotation of the electrode holding member about the joint in the opposite direction as well.

5. Apparatus according to claim 1 and in which an adjustable stop means is provided for limiting rotation of the electrode holder member about the joint in the opposite direction as well.

NILS GUSTAV SMITH.

REFERENCES CITED

The following references are of record in the file of this patent:

UNITED STATES PATENTS

| Number | Name | Date |
|---|---|---|
| 2,204,545 | Faunce | June 18, 1940 |
| 2,370,716 | Carter | Mar. 6, 1945 |
| 2,421,095 | Tyrner | May 27, 1947 |
| 2,422,811 | Tyrner | June 24, 1947 |